(12) United States Patent
Griffin et al.

(10) Patent No.: US 8,212,376 B2
(45) Date of Patent: Jul. 3, 2012

(54) APPARATUS AND METHOD FOR PROVIDING OPERATIVE POWER TO POWERLINE-NETWORK DEVICE

(75) Inventors: Peter Griffin, Hillsboro, TX (US); Dwayne Campbell, Fort Worth, TX (US)

(73) Assignee: RadioShack Corporation, Fort Worth, TX (US)

( * ) Notice: Subject to any disclaimer, the term of this patent is extended or adjusted under 35 U.S.C. 154(b) by 658 days.

(21) Appl. No.: 12/271,486

(22) Filed: Nov. 14, 2008

(65) Prior Publication Data

US 2010/0124882 A1    May 20, 2010

(51) Int. Cl.
*H02J 3/00* (2006.01)
*H04B 3/54* (2006.01)

(52) U.S. Cl. ..................... 307/1; 307/3; 307/4
(58) Field of Classification Search ............ 307/1, 3, 307/4

See application file for complete search history.

(56) References Cited

U.S. PATENT DOCUMENTS

| | | | |
|---|---|---|---|
| 7,082,372 B2 | 7/2006 | Rakshani et al. | |
| 7,742,271 B2 * | 6/2010 | Chen et al. | 361/119 |
| 7,813,842 B2 * | 10/2010 | Iwamura | 700/292 |
| 2005/0127869 A1 | 6/2005 | Calhoon et al. | |
| 2007/0271398 A1 | 11/2007 | Manchester et al. | |
| 2008/0106241 A1 | 5/2008 | Deaver et al. | |

* cited by examiner

*Primary Examiner* — Hal Kaplan

(57) ABSTRACT

An apparatus, and an associated method, for powering a powerline network apparatus, such as a HOMEPLUG™ transceiver. A data signal sensor is positioned to sense a data signal that is to be operated upon by the powerline network apparatus. When a data signal is sensed, an indication is formed, and the indication is used to control the switch positioning of a switch that interconnects a power supply with the powerline network apparatus. When the indication of sensing of the data signal is formed, the switch is closed, and the power supply is connected to the powerline-network apparatus operative power is provided to power the powerline network apparatus.

14 Claims, 3 Drawing Sheets

APPARATUS AND METHOD FOR PROVIDING OPERATIVE POWER TO POWERLINE-NETWORK DEVICE

The present invention relates generally to a manner by which to provide operative power to a powerline-network device, e.g., a HOMEPLUG™ capable, device. More particularly, the present invention relates to an apparatus, and an associated method, by which to provide operative power to the powerline-network device when a data signal is detected.

When embodied, e.g., at a HOMEPLUG™ transceiver, the transceiver is caused to be powered upon detection of a data signal at a HOMEPLUG™ transceiver input. Power-consumption control is provided by which to ensure that the transceiver is powered when its operation is needed and is not powered when its operation is not needed.

BACKGROUND OF THE INVENTION

The availability of, and access to, computer and communication devices are practical necessities for many in modern society. Many business enterprises, and other, activities require the use of such devices to carry out processing and communication functions.

While, in large part, once limited to academia and to large business enterprises, regular advancements in both communication and computer technologies that underlie such advancements have steadily reduced the costs, while also increasing the capabilities, of such devices. As advancements continue, yet further costs reductions and capacity improvements are likely.

Many communication and computer devices have been developed that are readily, or primarily, used for entertainment, or non-work activities. Such devices, as well as others, also are used for both business enterprise and for entertainment use. And, yet other devices are used primarily for business, and other enterprise, uses. In whatsoever application, such devices regularly send or receive data, herein referred to as data signals, during their operation. Memory devices, for instance, store data. When the data is accessed, the data is retrieved by the sending of data signals that are of values representative of the stored data. And, if data is written to a memory device, the data is provided to the memory device as a data signal of values representative of the data that is to be stored. A device at which data is originated is sometimes referred to as a data source, and the device at which the data signal is provided is sometimes referred to as a data sink. A communication path is required to interconnect the data sink and data source.

Most simply, a conductive wire, or path, is provided together with appropriate connectors by way of which to interconnect the data source and sink. When the data source and sink are positioned in close proximity to one another, such as next to one another, such conventional interconnection is easily made. However, when positioned at greater distances from one another, the interconnection becomes increasingly problematical. For instance, when the devices are located in different rooms, cabling is typically required to be installed to extend through walls separating, and defining, the separate rooms. If the cabling is not installed during construction of the walls, significant extra effort is required to provide the cabling, subsequent to the initial construction. And, in any event, device positioning is sometimes constrained by the locations at which the cabling is positioned, such as by the positioning of wall-mounted connectors formed at cable-ends. While the devices can sometimes be interconnected by way of radio connections, the radio connections are generally more complex, more likely to be bandwidth-constrained, more susceptible to interference, and more susceptible to unauthorized access of the communicated data.

Relatively recently, attention has been directed towards the use of powerlines, used conventionally to provide electrical power, also to communicate data. The dual use of the powerlines both to transmit electrical power and to communicate data is facilitated by modulating the data at a frequency that is different than, i.e., greater than, the frequency at which the electrical power is transmitted. For instance, a HOMEPLUG™ powerline alliance has been established to promulgate interoperability, and other, standards relating to powerline data communications. And, communication and computer devices have been developed, others are undergoing development, and yet other devices shall likely be developed to operate in conformity with the HOMEPLUG™ operating parameters. Use of power cables as communication paths or cables upon which to communicate data is advantageous for the reason that most home and building constructions include in-wall power cabling and multiple power outlets in each room of the home, building, or other construction. Simply by connecting, in an appropriate manner, a communication or computer device at the electrical power outlet, the device is thereby connectable to another analogously-connected device. For instance, in a single construction, the power cables form a wired network to which devices are connectable.

While HOMEPLUG™ capable devices are presently available, many aspects of their construction and operation can be improved.

It is in light of this background information related to powerline-network-connectable devices that the significant improvements of the present invention have evolved.

SUMMARY OF THE INVENTION

The present invention, accordingly, advantageously provides an apparatus, and an associated method, by which to provide operative power to a powerline-network device, e.g., a HOMEPLUG™ capable, device.

Through operation of and embodiment of the present invention, a manner is provided by which to provide operative power to the powerline-network device when a data signal is detected.

In one aspect of the present invention, a powerline-network device transceiver is caused to be powered in response to detection of a data signal at a powerline-network device transceiver input. By providing operative power to the powerline-network device transceiver only responsive to detection of the data signal, improved power consumption characteristics are provided through the control of the application of the operative power to the transceiver.

In another aspect of the present invention, a powerline-connectable communication device is provided that performs a communication operation upon a data signal. The communication device forms, for instance, a data receiver, connectable to, or operable as, a video display device, memory storage device, or other communication or computer device. The communication device alternately, or further, forms a data transmitter that is connectable to, or operates as, operates to transmit data-containing signals. The data transmitter, for instance, a mass-storage device, such as a DVD (digital video disk) drive, a computer HDD (hard disk drive) or any other device capable of forming a data source. And, the communication device forms, e.g., a communication transceiver capable of both sending and receiving data signals with another device.

In another aspect of the present invention, a power supply is provided that is capable of providing operative power to power the communication device. The operative power is, e.g., a direct-current power of voltage and current characteristics permitting powering of the communication device. The power supply, in one implementation, is formed of, or includes, a power converter for converting power of other characteristics, into power of the characteristics needed to power the communication device. The power of the other characteristics comprises, for instance, the electrical power provided by way of a household, or other, plugged connection. The power converter includes, e.g., a transformer and rectifier elements to convert voltage and/or current levels and to rectify and smooth input power.

In another aspect of the present invention, a switch is positioned between the power supply and the communication device. The switch, when positioned in a closed position, connects the power supply together with the communication device. And, when the switch is opened, the connection between the power supply and the communication device is broken, i.e., opened. And, the power supply does not supply operative power to power the communication device.

In another aspect of the present invention, a data signal sensor is further provided. The data signal sensor operates to sense a data signal applied to the communication device. The data signal comprises, for instance, a locally-generated data signal. Or, the data signal comprises a remotely-generated data signal. A locally-generated data signal comprises, for instance, a signal that is applied to a communication transmitter or delivery of a data signal that is to be received at the communication device. And, a remotely-generated data signal is analogous to, but generated remote from, the communication device. The remotely-generated data signal provided thereto, e.g., by way of a powerline. The remotely-generated data signal comprises, for instance, a signal that is to be provided to the communication device when the communication device forms a data receiver, such as a display screen.

When the data signal sensor senses a data signal, the data signal sensor generates an indication in response to the signal detection. The indication formed by the data signal sensor controls positioning of the switch that interconnects the power supply and the powerline-connectable communication device or is otherwise used to control whether operative power is applied to power the communication device. Sensing of the data signal by the data signal sensor is used to cause the operative power to be provided to the communication device. When the switch interconnects the power supply and the communication device, sensing of the data signal by the sensor causes the position of the switch to be closed. And, in the absence of sensing of the data signal, the switch is caused to be opened.

Control of the opening and the closing of the switch, or, more generally, application of the operative power to the communication device, in one implementation, includes a delay mechanism to cause operative power to continue to be applied to the communication device for a period subsequent to ending of sensing of a data signal. Transient loss of signal resulting in cycling on and off of the communication device is thereby avoided. And, in one implementation, upon sensing of the data signal, the operative power is caused to be provided to the communication device for at least a designated time, thereby also reducing the occurrence of cycling on and off of the communication device.

In one implementation, the communication device forms a powerline-network device in which the communication device forms a communication transceiver, transmitter, or receiver that communicates with another HOMEPLUG™ capable device. The devices are each connected to a home, or other, power circuit. Upon sensing of the data signal, the associated powerline-network device is caused to be powered and thereby operable in its intended manner. Control of the power to the powerline-network device is not powered when not utilized.

In these and other aspects, a powerline network apparatus, and an associated method, is provided. The powerline-connectable communication device is configured to perform a communication operation upon a data signal. A data signal sensor is configured to sense the data signal. When sensed, the data signal sensor permits powering of the powerline-connectable communication device, thereby to power the powerline-connectable communication device. In these and other aspects, an apparatus for controlling powering of at least a first powerline-network device is also provided. A control scheduler is configured to schedule at least one power-state change of the powerline-network device. A control signal generator is configured to generate a control signal responsive to scheduling performed by the control scheduler. The control signal controls the powering of the at least the first powerline-network device.

DETAILED DESCRIPTION

Figure 1:
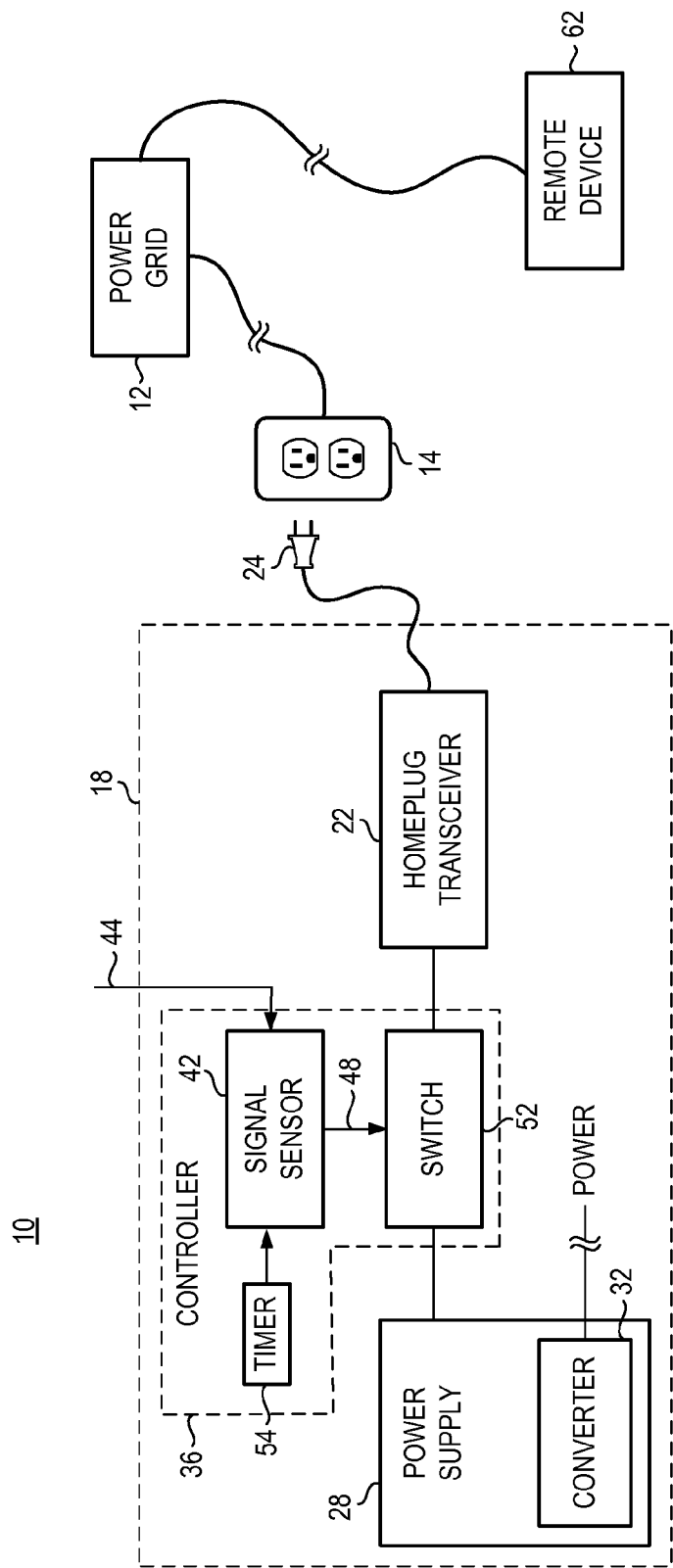
FIG. 1 illustrates a functional block diagram of an arrangement that includes an embodiment of the present invention.

Referring first to FIG. 1, an arrangement, shown generally at 10, provides for communications between devices connected by way of a power grid 12. The power grid 12, most simply, comprises part of the electrical wiring of a structure, such as a dwelling, office, or other business-enterprise, or other, structure. The power grid 12 is also representative of power cabling that encompasses greater distances that are greater than those typically separating areas of a single structure. The power grid, while conventionally installed for providing electrical power to power electrical devices positioned at such structures, is also usable to communicate data. Typically, as previously mentioned, data signals are typically modulated to be of frequencies much higher than the frequencies associated with the power sent upon the cables or wiring of the grid. Here, a conventional wall outlet 14 having conventional plug connectors forms an interface permitting plugged connection, in conventional manner, of an electrical device thereto.

In the exemplary implementation, a powerline-network device 18 having a HOMEPLUG™ capable transceiver 22 is connected by a plugged connection of a plug 24 at the outlet 14. The powerline-network device transceiver is of any of various configurations, capable of sending and receiving data signals. In other implementations, rather than a HOME-PLUG™ transceiver, a HOMEPLUG™ capable receiver or a HOMEPLUG™ capable transmitter is instead utilized. The device 18 operates in conjunction with, for instance, a DVD, hard disk drive, or other computer mass storage medium whose contents are accessible and retrievable for playout of the stored data. Or, the device 18 operates in conjunction with a display device that displays data, such as the playout of data retrieved from a DVD or HDD. And, more generally, the device 18 operates in conjunction with virtually any device capable of powerline-network-connection to send or to receive data signals. Such device is herein referred to as a connected device.

The device 18 further includes a power supply 28. The power supply is of characteristics to provide operative power capable of powering the powerline-network device transceiver 22. Here, the power supply is connected to the plug connector 14 by way of a power converter 32 that is embodied together with the power supply. The power converter converts input power characteristics into power characteristics that are usable by the power supply 28. For instance, if the power comprises 110 volt alternating current (ac) power, the power converter includes a step-down mechanism, such as a transformer, along with rectifier circuitry to convert to the input power into power of characteristics usable by the power supply 28. In an implementation in which the power supply 28 comprises rechargeable battery cells, the power converter converts the input power into 10 w-voltage, e.g., 5 volt, direct-current (dc) power suitable to recharge the battery cells of the power supply and, alternately, to provide the output power that is of characteristics to cause operation of the powerline-network device transceiver.

The device 18 further includes a controller 36 that controls operation of the device. Here, the controller is shown to include a signal sensor 42. The signal sensor operates to sense, i.e., detect, a data signal. The line 44 is representative of a signal path upon which a data signal is communicated, or of which indications of communication thereof are provided to the signal sensor. In the event that the signal sensor senses a data signal, an indication is generated, here represented on the line 48, to indicate its sensing. Most simply, the signal sensor senses signal energy at the frequency of interest, i.e., within a frequency range that such a data signal is generated. Or, to provide individual control, MAC (medium access control)-layer, or other addresses are used to identify specific devices. And, the signal sensor operates to detect specific addresses. The controller also includes, or controls, a switch element 52. The switch element is positioned in-line between the power supply and the powerline-network device transceiver. Depending upon the switch position of the switch 52, the power supply is connected to the transceiver or the power supply is maintained out of connection with the transceiver.

The indication generated by the signal sensor on the line 48 controls the positioning of the switch 52. Namely, when the indication indicates that a signal has been sensed, the switch is caused to be placed in the closed position. Thereby, the switch interconnects the power supply with the transceiver and thereby provides operative power to operate to the transceiver. Conversely, in the absence of detection of a data signal, the signal sensor provides the negative indication, or no indication, and the switch element is caused to be placed in the open position, and the transceiver is not provided with operative power. The switch is of any of various constructions including, for instance, a transistor-switch, or other integrated-switch circuit elements. Hysteresis-providing functionality is, e.g., provided to reduce the occurrence of repeated switching at too-quick intervals.

In one implementation, the signal sensor includes a timer 54 that commences timing upon sensing by the signal sensor of a data signal on the line 44. In one implementation, the indication generated on the line 48 continues to be generated at least until the timer times-out, thereby maintaining the switch in the closed position until the timer times out. By delaying the opening of the switch, transient signals, or momentary loss of signal detection prevents immediate opening of the switch and disconnection of the transceiver from the power supply. And, in another implementation, the timer 54 commences timing when the signal sensor no longer senses the data signal. And, the switch is maintained in the closed position until the timer times out. The operative power is thereby provided to the transceiver circuitry for a period subsequent to the period during which the data signal is sensed by the sensor. Other manners by which to control the closing and opening of the switch 52 are, of course, possible. And, alternate to, or in addition to, timing functionality of the element 54, event- or address-related information is provided. Address or event information is provided by the element 54 and used by the signal sensor.

The data signal, or an indication thereof, that the signal sensor senses is either a locally-generated signal or a remotely-generated signal. That is to say, the signal sensor senses a signal generated by a device in proximity to the device 18, such as a data signal sourced at a data source that is connected to the transceiver 22. Or, the data signal is generated remotely, such as at a remote device 62 that is connected to the power grid 12. A data signal generated at the remote device is sent by way of the power grid, available and detectable at the plug connector 14. Thereby, in whichsoever direction of the data signal i.e., an originating data signal to be transmitted by the transceiver or a terminating data signal to be terminated at the transceiver, the signal sensor is able to sense and, in turn, cause the switch 52 to be closed, thereby to permit power to be provided to the transceiver to operate the transceiver. Through use of signal sensing by the signal sensor to control the positioning of the switch, the transceiver caused to be powered at any time in which a data signal is to be transmitted or received. And, at other times, the transceiver is unpowered, thereby to conserve power consumption.

Figure 2:
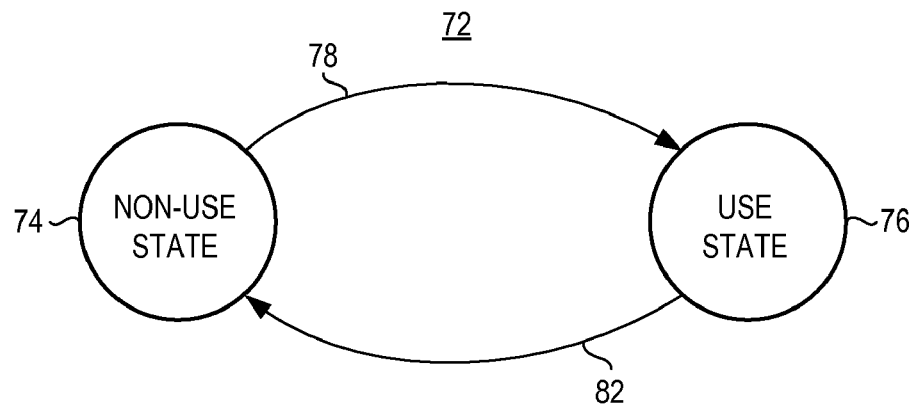
FIG. 2 illustrates a state diagram representative of operational states of a powerline-connectable communication device that forms part of the arrangement shown in FIG. 1.

FIG. 2 illustrates a simplified, state diagram 72 representation of the device 18 shown in the arrangement of FIG. 1. The controller 36, also shown in FIG. 1, controls operation of the device to place it alternately in a non-use state 74 and a use state 76. When in the non-use state, the transceiver 22, shown in FIG. 1, is not provided with operative power. And, when in the use state 76, the transceiver is provided with operative power to provide for transceiving operations to be carried out by the transceiver.

In the absence of sensing of a data signal, the device is maintained in the non-use state in which the transceiver is not powered. Upon sensing of a data signal, the path 78 is taken from the non-use state to the use state, and the transceiver is powered, permitting its operation. When the data signal is no longer sensed, the path 82 is taken to remove the device out of the use state and to return the device to the non-use state. Because the device is placed in, and maintained, in the use state, a higher power-consumptive state, only when the signal sensor senses a data signal, power consumption is minimized.

Figure 3:
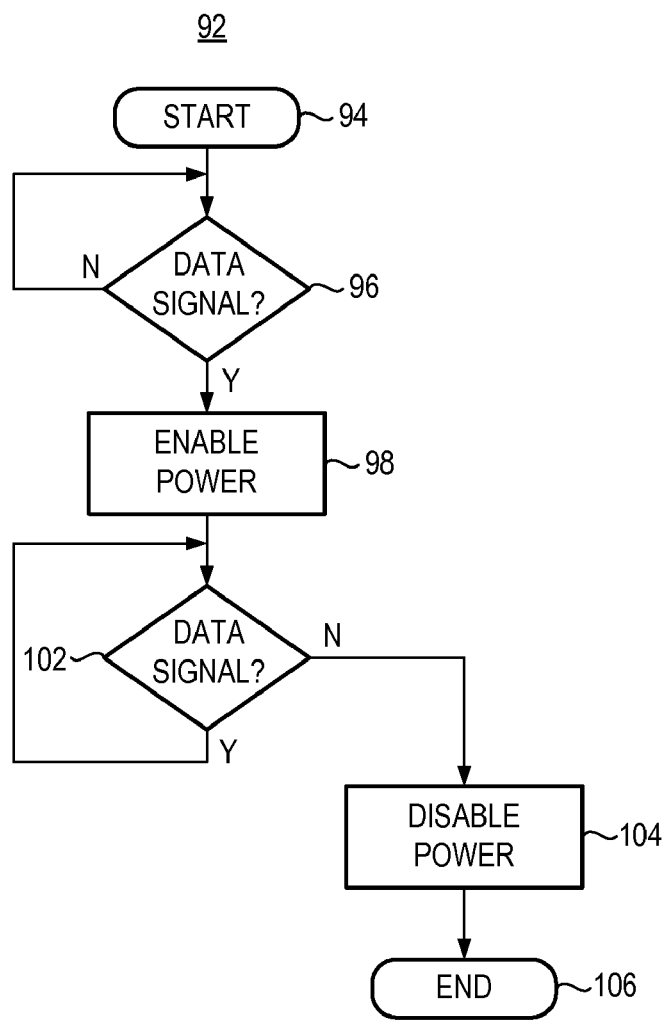
FIG. 3 illustrates a process diagram representative of the process of operation of an embodiment of the present invention.

FIG. 3 illustrates a process diagram shown generally at 92, representative of the process of operation of an embodiment of the present invention. After commencement of the process, indicated by the start block 94, a determination is first made, indicated by the decision block 96, as to whether a data signal has been sensed. If not, the no branch is taken back to the decision block. If, conversely, a data signal is sensed, the yes branch is taken to the block 98.

At the block 98, responsive to sensing of the data signal, a powerline-network device is caused to be powered. Powering of the powerline-network device provides for operation of a powerline-network device-connected load device. Subsequent to enabling of the powerline-network device, a determination is made, indicated by the decision block 102, as to whether the data signal continues to be sensed. If so, the yes branch is taken back to the decision block. If, conversely, the data signal is no longer detectable, the no branch is taken to the block 104, and power to the device is disabled, i.e., no longer powered. And, the process ends, indicated by the block 106.

Figure 4:
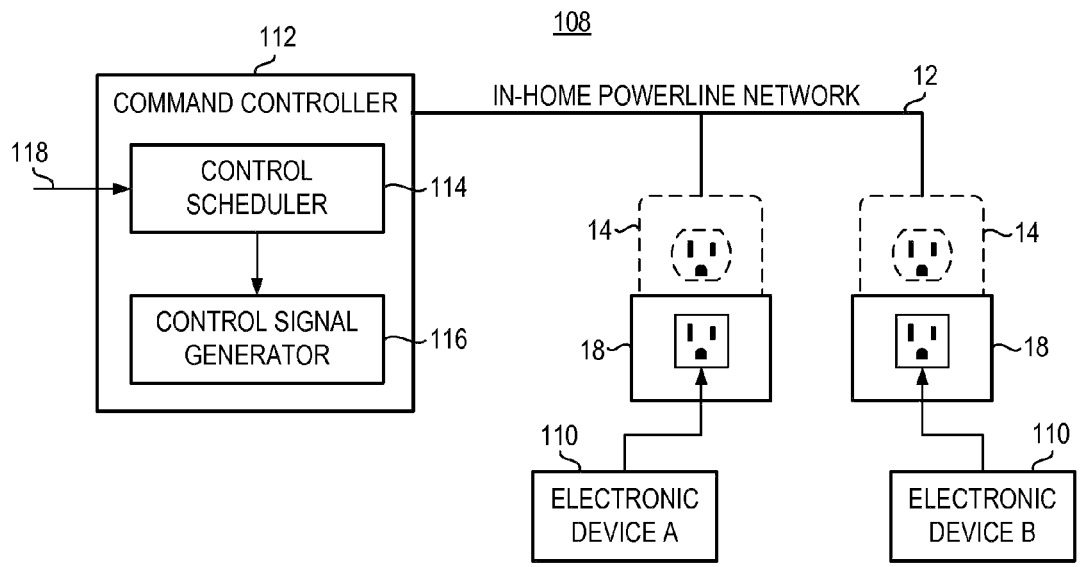
FIG. 4 illustrates an arrangement that includes a further embodiment of the present invention.

FIG. 4 illustrates an arrangement, shown generally at 108, of a further embodiment of the present invention. Here, multiple devices 18 are shown, each of which is associated with an electronic device 110. An electronic device 110 is positioned in a plug-connected-connection with its associated device 18. And, each device 18 is connected in a plugged connection with an outlet 14 connected to a power grid, here an in-home powerline network. The devices 18 are analogous, or otherwise include the elements shown previously in FIG. 1 including data signal sensors.

Here, a command controller 112 is further provided. The command controller 112 includes a control scheduler 114 and a control signal generator 116. During operation, the command controller operates to control the powering of the devices 18. Signals generated by the control signal generator 116 cause the powering-on or powering-off of the devices 18. The control signal generated by the control signal generator is of characteristics permitting the devices 18 individually to be powered-on and powered-off, using specific MAC, or other, addresses. Or, alternately, the control signal causes devices to be powered-on and -off on a group basis.

Control signals generated by the generator 116 are generated in response to a schedule formed by the control scheduler. Most simply, the control scheduler comprises a schedule responsive to a user input, here indicated by way of the line 118. And, in a further embodiment, the schedule comprises a day-schedule, a week-schedule, etc. that identify turn-on and turn-off times for the individual devices and their associated elements 110. In another implementation, the control scheduler is event-based rather than time-based or is a combination of both time-based and event-based schedule entries. When the time or event arrives or occurs, the control signal generator is provided with an indication thereof, and the control signal generator generates a data signal in response thereto. The data signal is communicated upon the powerline network 12 and detected by the appropriate device or devices. If a controller sends a signal and the power line was quiet, it may be necessary to retransmit—or transmit a wakeup message or preamble to allow the transceiver to be alert at the time the command is sent.

The command controller is variously implemented as a stand-alone device or forms part of a computing station, such as an algorithm executable thereat, or, in any other manner, is connectable to the powerline network to provide the data signals generated by the control signal generator 116 thereon.

Figure 5:
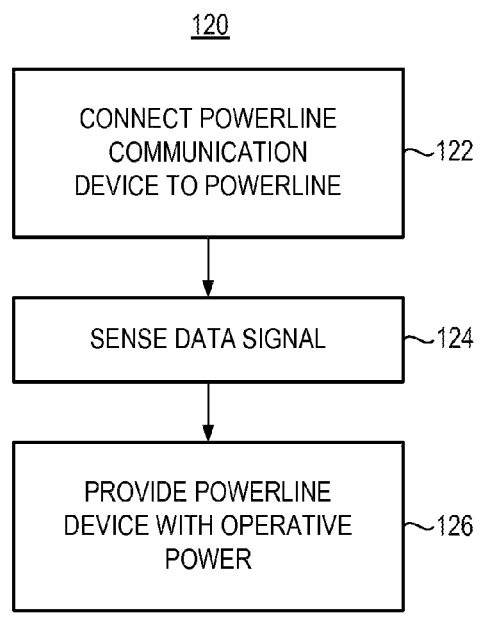
FIG. 5 illustrates a method flow diagram representative of the method of operation of an embodiment of the present invention.

FIG. 5 represents a method flow diagram shown generally at 120, representative of the method of operation of an embodiment of the present invention. The method facilitates operation of a powerline communication device.

First, and as indicated by the block 122, the powerline communication device is connected with a powerline. Then, as indicated by the block 124, a data signal is sensed.

Then, and as indicated by the block 126, the powerline communication device is provided with operative power responsive to sensing of the data signal. Subsequently, in the absence of detection of the data signal, the powerline communication device is no longer provided with the operative power.

Because the powerline communication device is provided with operative power only during the period in which the data signal is sensed, excessive power consumption is avoided.

Presently preferred embodiments of the invention and many of its improvements and advantages have been described with a degree of particularity. The description is of preferred examples of implementing the invention and the description of the preferred examples is not necessarily intended to limit the scope of the invention. The scope of the invention is defined by the following claims.

What is claimed is:

1. A powerline network apparatus configured for coupling to a connected device and having reduced power consumption, said powerline network apparatus comprising:
   a powerline-connectable communication device that communicates with a remote device via a powerline;
   a power supply that provides direct current electrical power to said powerline-connectable communication device;
   a signal sensor, which accepts a first data signal received from the connected device and a second data signal received from said remote device, said signal sensor configured to detect the presence of either said first data signal or said second data signal and to provide an indication of said detection; and
   a switch that switchably couples said power supply to said powerline-connectable communication device during a period of time when said detection indication is provided.

2. The powerline network apparatus of claim 1 wherein said powerline-connectable communication device comprises a HOMEPLUG™-capable communication device.

3. The powerline network apparatus of claim 1 wherein said signal sensor is embodied within said powerline-connectable communication device.

4. The powerline network apparatus of claim 1 wherein at least one of said first data signal and said second data signal that said signal sensor is configured to detect is at a frequency higher than a frequency associated with power conveyed on the powerline.

5. The powerline network apparatus of claim 1 wherein the signal that said signal sensor is configured to detect identifies said powerline-connectable communication device with a powerline-connectable communication-device address.

6. The powerline network apparatus of claim 1 further comprising a battery coupled to said power supply and to said powerline-connectable communication device.

7. An apparatus for controlling powering of at least a first HOMEPLUG™ device, said apparatus comprising:
   a control scheduler configured to schedule at least one power-state change of the first HOMEPLUG™ device; and
   a control signal generator configured to generate a control signal responsive to scheduling performed by said control scheduler, the control signal for causing a detection at a signal sensor at the first HOMEPLUG™ device, which accepts said control signal and a second data signal received from a remote HOMEPLUG™ device, said signal sensor configured to detect the presence of either said control signal or said second data signal and to provide an indication of said detection to a switch at the first HOMEPLUG™ device that switchably couples a first HOMEPLUG™ device power supply to the first HOMEPLUG™ device during a period of time when said detection indication is provided.

8. The apparatus of claim 7 wherein the at least the first HOMEPLUG™ device comprises a plurality of HOMEPLUG™ devices and wherein said control scheduler is configured to schedule power-state changes of the plurality of HOMEPLUG™ devices.

9. A data communication system for communication of data from a local connected device to a remote connected device, comprising:
 a first powerline network apparatus coupled to the local connected device and a second powerline network apparatus coupled to the remote connected device, said first powerline network apparatus communicating with said second powerline-connectable communication device via a powerline;
 said first powerline network apparatus and said second powerline network apparatus each comprising:
  a transceiver;
  a power supply that provides electrical power to its respective transceiver,
  a signal sensor, which includes an input upon which a first data signal is received from a respective connected device and a second data signal is received from the other connected device, said signal sensor configured to detect a presence of either said first data signal or said second data signal and to provide an indication of said detection, and
  a switch; and
 wherein said first powerline network apparatus, in response to an indication of a first data signal detection, switchably couples said first powerline network apparatus power supply to said first powerline network apparatus transceiver during a period of time when said first powerline network apparatus first data signal detection indication is provided and wherein said second powerline network apparatus, in response to an indication of detection of a second data signal from said first powerline network apparatus, switchably couples said second powerline network apparatus power supply to said second powerline network apparatus transceiver during a period of time when said second powerline network apparatus second data signal detection indication is provided.

10. The powerline network apparatus of claim 1 wherein said powerline-connectable communication device comprises a transceiver.

11. The powerline network apparatus of claim 1 wherein said remote device further comprises a HOMEPLUG™-capable communication device.

12. The powerline network apparatus of claim 1 further comprising a timer coupled to said signal sensor whereby hysteresis for said indication of detection is provided.

13. The powerline network apparatus of claim 12 wherein said timer commences timing upon said detection of either said first data signal or said second data signal.

14. The powerline network apparatus of claim 12 wherein said timer commences timing upon a disappearance of said detection of either said first data signal or said second data signal.

* * * * *